US010095826B2

(12) United States Patent
Somani et al.

(10) Patent No.: US 10,095,826 B2
(45) Date of Patent: Oct. 9, 2018

(54) FEED-FORWARD FOR SILICON INSPECTIONS (DFM2CFM : DESIGN TO SILICON) AND FEED-BACK FOR WEAKPOINT PREDICTOR DECKS (CFM2DFM : SILICON TO DESIGN) GUIDED BY MARKER CLASSIFICATION, SAMPLING, AND HIGHER DIMENSIONAL ANALYSIS

(71) Applicant: GLOBALFOUNDRIES Inc., Grand Cayman (KY)

(72) Inventors: Shikha Somani, Sunnyvale, CA (US); Sriram Madhavan, Santa Clara, CA (US); Thomas Herrmann, Radebeul (DE); Stefan Schüler, Dresden (DE); Uwe Schroeder, Santa Cruz, CA (US); Shobhit Malik, San Jose, CA (US); Eric Chiu, San Jose, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 43 days.

(21) Appl. No.: 15/184,164

(22) Filed: Jun. 16, 2016

(65) Prior Publication Data

US 2017/0364626 A1    Dec. 21, 2017

(51) Int. Cl.
*G06F 17/50*    (2006.01)
(52) U.S. Cl.
CPC ...... *G06F 17/5081* (2013.01); *G06F 2217/12* (2013.01); *G06F 2217/14* (2013.01)
(58) Field of Classification Search
CPC ............. G06F 17/5081; G06F 2217/12; G06F 2217/14

(Continued)

(56) References Cited

U.S. PATENT DOCUMENTS

2009/0297019 A1* 12/2009 Zafar ................. G03F 1/84
                                                    382/145
2015/0154746 A1*  6/2015 Zafar ................. G03F 1/84
                                                    382/149

OTHER PUBLICATIONS

Somani et al. "A methodology to optimize design pattern context size for higher sensitivity to hotspot detection using pattern association tree (PAT)" from "https://www.researchgate.net/publication/278329476_A_methodology_to_optimize_design_pattern_context_size_for_higher_sensitivity_to_hotspot_detection_using_pattern_association_tree_PAT", retrieved on Jun. 15, 2016, 13 Pages.

\* cited by examiner

*Primary Examiner* — Stacy Whitmore
(74) *Attorney, Agent, or Firm* — Ditthavong & Steiner, P.C.

(57) ABSTRACT

A method and apparatus for selecting Si wafer WP based on individual or multiple DFM decks for Si-feed-forward and Si-feed-back analysis are provided. Embodiments include generating markers for a wafer from an individual DFM deck; generating UCF Indexes; determining whether a representative marker corresponding to a UCF is a candidate for WP prediction; extracting markers corresponding to that UCF-Index (UEF data) from a candidate; performing a UCF-Index-based sampling on the extracted UEF data set if a number of markers in the extracted UEF data set is larger than an inspection requirement; adding a location of each marker or group of markers in the extracted UEF data set to a sitelist after the UCF-Index-based sampling; sending the sitelist to a foundry for metrology analysis on sitelist locations; and adding the sitelist locations and corresponding UCF Index and metrology parameters to a design analysis database for analyzing other wafers/UCF Indexes.

20 Claims, 2 Drawing Sheets

(58) Field of Classification Search
USPC .................................. 716/54, 136; 700/121
See application file for complete search history.

FEED-FORWARD FOR SILICON INSPECTIONS (DFM2CFM : DESIGN TO SILICON) AND FEED-BACK FOR WEAKPOINT PREDICTOR DECKS (CFM2DFM : SILICON TO DESIGN) GUIDED BY MARKER CLASSIFICATION, SAMPLING, AND HIGHER DIMENSIONAL ANALYSIS

TECHNICAL FIELD

The present disclosure relates to a manufacture of semiconductor devices such as integrated circuits. The present disclosure is particularly applicable to detecting yield detractors in silicon (Si) wafers.

BACKGROUND

Detecting design geometries with a high correlation with yield detractors early on in the design process is a key for improving yield. Known approaches generate sitelists for Si inspections based on pattern matching of the patterns harvested by pattern classification of (optical rule check (ORC)/manufacturing rule check (MRC)/design rule check (DRC)/Si defect) markers at some fixed radius and fuzziness. However, these approaches lack precision and sensitivity. Even if a pattern association tree (PAT) approach is implemented, such methodology suffers from dependency on electronic design automation (EDA) vendor pattern classification licenses, which are expensive. In addition, due to the prohibitive cost of the EDA vendor pattern classification licenses and runtimes, only a subset of the ORC/MRC/DRC flagged locations, e.g., from the lower left corner of a design, are classified and used for sitelist generation for Si inspections. This leads to incomplete coverage of the variability detected by these ORC/MRC/DRC markers in the design. Moreover, none of the design for manufacturing (DFM) collateral decks, e.g., manufacturing analysis and scoring (MAS), target MAS (tMAS), routing signature analysis (RSA) back-end-of-line (BEOL), device profiling, design finishing-pattern optimization deck (DF-POP), advanced design rule check (DRC+), chemical mechanical polishing (CMP), critical area analysis (CAA), etc., flagged locations are directly used to drive Si inspections that can help to identify yield detractors. Further, the complex interactions that lead to defects are particularly hard to predict by using just one EDA vendor tool deck.

A need therefore exists for methodology and apparatus enabling capture of defects early on rather than as part of a later Si discovery process.

SUMMARY

An aspect of the present disclosure is a method of Si wafer weak point (WP) selection based on individual DFM decks for Si-feed-forward and Si-feed-back analysis.

Another aspect of the present disclosure is method of Si wafer WP selection based on combining multiple sources (DFM decks) for Si-feed-forward and Si-feed-back analysis.

A further aspect of the present disclosure is an apparatus that selects Si wafer weak points based on individual or multiple combined DFM decks for Si-feed-forward and Si-feed-back analysis.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a method including: generating markers for a Si wafer from an individual DFM deck, the DFM deck based on rules and patterns; generating universal compact format (UCF) Indexes based on representative markers, a unique set of values of properties of each generated marker, and an occurrence count of the unique set of values of properties; determining whether a representative marker corresponding to a UCF Index is a candidate for WP prediction on the wafer; extracting all of the markers corresponding to that UCF-Index (universal extended format (UEF) data set) from a WP prediction candidate, the UEF data set based on the values of the properties at each marker location on the wafer; performing a UCF-Index-based sampling on the extracted UEF data set if a number of markers in the extracted UEF data set is larger than an inspection requirement; adding a location of each marker or group of markers in the extracted UEF data set to a sitelist after the UCF-Index-based sampling; sending the sitelist to a foundry to perform metrology analysis on sitelist locations; and adding the sitelist locations and corresponding UCF Index and metrology parameters to a design analysis database for analyzing other Si wafers and/or other UCF Indexes.

Aspects of the present disclosure include generating the plurality of markers by: comparing the rules and patterns of the DFM deck against design configurations on different layers of the wafer. Other aspects include generating a UCF Index by: binning the UEF data associated with each generated marker based on the unique set of values of the properties of each generated marker; and assigning an occurrence count for each UCF bin to the UCF Index. Further aspects include determining whether a UCF is a candidate for WP prediction by: comparing the UCF against a criticality metric; and discarding the UCF if the UCF does not pass the criticality metric. Another aspect includes adding the marker location of each marker in the generated UEF data set to the sitelist without performing the UCF-Index-based sampling if the number of markers in the extracted UEF data set is smaller than an inspection requirement. Additional aspects include performing the UCF-Index-based sampling by: selecting a number of markers from each UCF bin based on a weighting function; performing a spatial distribution on markers from each UCF Index bin to determine which of the markers are the selected markers; and adding a location of an Index center for each UCF Index bin to the sitelist based on the spatial distribution.

Another aspect of the present disclosure is a method including: generating markers for a Si wafer from a plurality of DFM decks, each DFM deck based on rules and patterns; generating UCF Indexes based on representative markers, unique set of values of properties of each generated marker, and an occurrence count of the unique set of values of properties; determining whether a representative marker corresponding to a UCF Index is a candidate for WP prediction on the wafer; extracting all of markers corresponding to that UCF-Index (UEF data set) from a WP prediction candidate, the UEF data set based on the values of the properties at each marker location on the wafer; stacking UEF data sets based on a same location identified on different layers of the wafer and/or by different DFM decks; determining whether the same location passes a criteria for being a critical WP; adding the same location to a sitelist if the same location passes the criteria; sending the sitelist to a foundry to perform metrology analysis on sitelist locations; and adding the sitelist locations and corresponding UCF Index and metrology parameters to a design analysis database for analyzing other Si wafers and/or other UCF Indexes.

Aspects of the present disclosure include generating the plurality of markers by: comparing the rules and patterns of each DFM deck against design configurations on different layers of the wafer. Other aspects include generating a UCF Index by: binning the UEF data associated with each generated marker based on the unique set of values of the properties of each generated marker; and assigning an occurrence count for each UCF bin to the UCF Index. Further aspects include determining whether a UCF is a candidate for WP prediction by: comparing the UCF against a criticality metric; and discarding the UCF if the UCF does not pass the criticality metric. Another aspect includes determining whether a same location passes the criteria for being a critical WP by: weighting each UCF Index corresponding to the same location based on a corresponding DFM deck; and discarding each UCF Index that does not pass the criteria. Additional aspects include performing a UCF-Index-based sampling on a stacked UEF data set if a number of UEF data sets within the stacked data set is larger than an inspection requirement; and adding the same location of the stacked UEF data set to the sitelist after the UCF-Index-based sampling or without performing the UCF-Index-based sampling if the number is smaller than the inspection requirement. Other aspects include performing the UCF-Index-based sampling by: selecting a number of markers from each UCF Index bin based on a weighting function; performing a spatial distribution on markers from each UCF Index bin to determine which of the markers are the selected markers; and adding a location of an Index center for each UCF Index bin to the sitelist based on the spatial distribution.

A further aspect of the present disclosure is an apparatus including: a processor; and a memory including computer program code for one or more programs, the memory and the computer program code configured to, with the processor, cause the apparatus to: generate markers for a Si wafer from a DFM deck or from a plurality of DFM decks, each DFM deck based on rules and patterns; generate UCF Indexes based on representative markers, unique set of values of properties of each generated marker, and an occurrence count of the unique set of values of properties; determine whether a representative marker corresponding to a UCF Index is a candidate for WP prediction on the wafer; extract all of the markers corresponding to that UCF-Index (UEF data set) from a WP prediction candidate, the UEF data set based on the values of the properties at each marker location on the wafer; perform a UCF-Index-based sampling on the extracted UEF data set if a number of markers in the extracted UEF data set is larger than an inspection requirement and the markers are generated by the DFM deck or stack UEF data sets based on a same location identified on different layers of the wafer and/or by different DFM decks if the markers are generated by the plurality of DFM decks; determine whether the same location passes a criteria for being a critical WP if the plurality of markers are generated by the plurality of DFM decks; add a location of each marker or group of markers in the extracted UEF data set to a sitelist after the UCF-Index-based sampling the markers are generated by the DFM deck or the same location to the sitelist if the same location passes the criteria and the markers are generated by the plurality of DFM decks; send the sitelist a foundry for metrology analysis on the sitelist locations; and add the sitelist locations and corresponding UCF Index and metrology parameters to a design analysis database for analyzing other Si wafers and/or other UCF Indexes.

Aspects of the apparatus include the apparatus being further caused to: compare the rules and patterns of the DFM deck or each DFM of the plurality of DFM decks against design configurations on different layers of the wafer to generate the plurality of markers depending on whether the markers are generated by the DFM deck or the plurality of DFM decks, respectively. Other aspects include the apparatus being further caused to: bin UEF data associated with the markers based on the unique set of values of the properties of each marker; and assign an occurrence count for each UCF bin to the UCF Index to generate a UCF Index. Further aspects include the apparatus being further caused to: compare the UCF against a criticality metric to determine whether a UCF is a candidate for WP prediction; and discard the UCF if the UCF does not pass the criticality metric. Another aspect includes the apparatus being further caused to: weight each UCF Index corresponding to the same location based on a corresponding DFM deck to determine whether the same location passes the criteria for being a critical WP; and discard each UCF Index that does not pass the criteria. Additional aspects include the apparatus being further caused to: perform a UCF-Index-based sampling on a stacked UEF data set if a number of UEF datasets within the stacked data set is larger than an inspection requirement; and add the same location of the stacked UEF data set to the sitelist after the UCF-Index-based sampling or without performing the UCF-Index-based sampling if the number is smaller than the inspection requirement. Other aspects include the apparatus is further caused to: select a number of markers from each UCF Index bin based on a weighting function; perform a spatial distribution on markers from each UCF Index bin to determine which of the marks are the selected markers; and add a location of an Index center for each UCF Index bin to the sitelist based on the spatial distribution to perform the UCF Index-based sampling.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves the current problems of lack of precision and sensitivity to various sources of markers; expensive EDA vendor pattern classification licenses; lack of geometric variability coverage; and an inability to combine different collaterals attendant upon Si wafer inspection.

Methodology in accordance with embodiments of the present disclosure includes generating markers for a Si wafer from an individual DFM deck, the DFM deck based on rules and patterns. UCF Indexes are generated based on representative markers, unique set of values of properties of each generated marker, and an occurrence count of the unique set of values of properties and examined to determine whether a representative marker corresponding to a UCF Index is a candidate for WP prediction on the wafer. All of the markers corresponding to that UCF-Index (UEF data set) are extracted from a WP prediction candidate, the UEF data set based on the values of the properties at each marker location on the wafer. A UCF-Index-based sampling is performed on the extracted UEF data set if a number of markers in the extracted UEF data set is larger than an inspection requirement. The marker location of each marker or group of markers in the extracted UEF data set is added to a sitelist after the UCF-Index-based sampling. The sitelist is sent to a foundry to perform metrology analysis on sitelist locations and the sitelist locations and corresponding UCF Index and metrology parameters are added to a design analysis database for analyzing other Si wafers and/or other UCF Indexes.

Still other aspects, features, and technical effects will be readily apparent to those skilled in this art from the following detailed description, wherein preferred embodiments are shown and described, simply by way of illustration of the best mode contemplated. The disclosure is capable of other and different embodiments, and its several details are capable of modifications in various obvious respects. Accordingly, the drawings and description are to be regarded as illustrative in nature, and not as restrictive.

Figure 1:
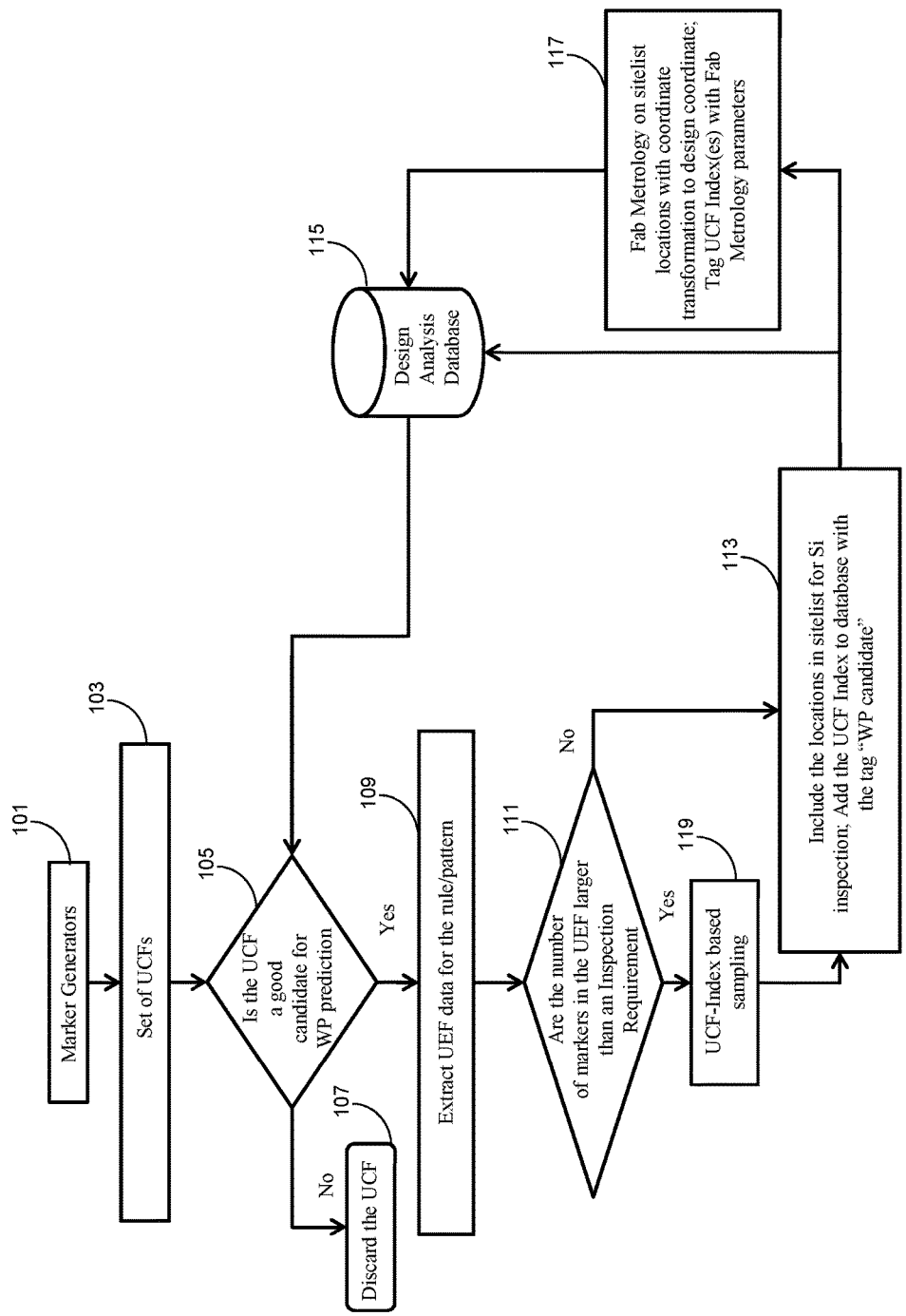
FIG. 1 illustrates a Si wafer WP selection flow based on an individual DFM deck, in accordance with an exemplary embodiment.

FIG. 1 illustrates a Si wafer WP selection flow based on an individual DFM deck, in accordance with an exemplary embodiment. In step 101, markers for a Si wafer are generated from an individual DFM deck, e.g., DRC+, DF-POP, MAS, tMAS, RSA, ORC, MRC, DRC, front-end-of-line (FEOL) density, CMP, etc. The markers are generated by comparing the rules and patterns of the DFM deck, e.g., MAS, against design configurations on different layers of the wafer. Each deck may include, for example, 100s of rules and patterns. The markers generated by the DFM decks include properties/measurements about the design.

In step 103, a set of UCFs are generated by the DFM deck. One UCF is generated per rule or pattern and, therefore, e.g., 100s of UCFs may be generated by a deck. A UCF Index is generated by binning or classifying the UEF data (physically significant property measurements at all of the marker locations) associated with each generated marker based on the unique set of values of each marker's properties (including the marker shapes) that distinguish the markers. The UCF/UEF framework standardizes the marker data across numerous sources (various different decks probing a design or metrology/inspection tools probing a wafer) in a foundry by identifying the key common attributes and normalizing the data to a form that accommodates all of the critical statistical information about these markers from the different sources. In other words, the UCF Index simply clusters all of the locations on the design with the same set of properties. This does not mean that the geometry of all of the markers are exactly the same; e.g., when the properties are the DFM properties, the geometry may be different for the same set of DFM properties. The same holds true for patterns with fuzziness. An occurrence count is added to each bin based on the number of markers within each bin.

In step 105, a representative marker corresponding to a UCF Index is examined based on a criticality metric to determine whether the UCF is a good candidate for WP prediction on the wafer. The criticality metric may be based, for example, on a high occurrence count, property combinations pushing margins close to DRC, statistical analysis of the UCF, and/or metrology parameters and previous history. In step 107, if the particular UCF is determined not to be a candidate, then it is discarded. For example, some of the UCFs may already describe something that is known by the foundry about the wafer and, therefore, there is no need for further Si inspection at that location on the wafer.

In step 109, if the UCF is a good candidate for WP prediction, then all of the markers corresponding to that UCF-Index (UEF data set) are extracted. All of the UEF data is not extracted in step 103 when the UCFs are first generated because the UCFs are sufficient for statistical analysis purposes, and the UCFs enable the foundry to maintain a lower computational footprint compared with all of the UEF data; however, the UCFs lack the requisite actual location information associated with the UEF data. In step 111, the number of markers in the extracted UEF data set are examined to determine whether the number is larger than an inspection requirement. If the number is smaller than the inspection requirement, then the locations are added directly to a sitelist for Si inspection in step 113, and the sitelist is added to a design analysis database in step 115. In step 113, the corresponding UCF Index is also tagged "WP candidate" and added to the design analysis database in step 115. In step 117, a foundry or Fab performs a metrology analysis on the sitelist with coordinate transformation to design coordinates. The corresponding UCF Index(es) are also tagged with Fab metrology parameters in step 117 and included in the design analysis database of step 115 for analyzing future wafers and/or UCF Indexes in step 105.

In step 119, if the number of markers is greater than an inspection requirement, then a UCF-Index-based sampling is performed on the extracted UEF data set. The UCF-Index-based sampling enables a more comprehensive and unbiased coverage of the variability in the markers based on the properties in comparison to random sampling or selective regions (e.g., high density regions or certain parts like cpu/gpu of the design). For instance, 20 markers may be generated by a DFM deck, e.g., MAS. The 20 markers may then be classified, e.g., into six different bins based on the unique set of values of properties of the markers. For example, the different bins may have the following occurrence counts: Bin 1 (2); Bin 2 (4); Bin 3 (2); Bin 4 (5); Bin 5 (1); and Bin 6 (6). For a given sample size, how many markers are picked from every UCF Index bin for adding to the sitelist may be decided, e.g., based on a weight function. For instance, the weight function may be a default weight for all rules: the number of markers to be included in the sample from every UCF Index bin is proportional to the occurrence count for each bin. In another instance, the weight function may be a custom weight for a rule: the weight could be a function of the whole UCF Index, i.e., DFM property values along with occurrence count, and not just the occurrence count. For instance, with respect to Bin 6, the weight would equal 0.3 (occurrence count/total number of marker), the expected number of markers for a sample size of 10 would be 3, and the selected number of markers from Bin 6 would be 3. It should be noted that at least one marker is included from every bin so that every topology has representation in the final sample and where necessary, selections are rounded up to the higher number for a more liberal inclusion in the sample.

Once the number of markers for inclusion in the sample is determined, which 3 of the 6 markers of Bin 6 for determining the location that will be added to the sitelist is resolved. First, a spatial distribution, e.g., a shuffling, of the 6 markers is performed to remove bias and any symmetry. Next, a randomization is performed in steps to further enforce an even spatial distribution. Last, the original coordinate system of the markers is replaced with an Index center Origin, i.e., the center of the Index markers distribution using the formula:

$$\text{Origin}X_{Index} = \frac{\text{Min}(\{x_i\}_{Index\ Markers}) + \text{Max}(\{x_i\}_{Index\ Markers})}{2}$$
$$\text{Origin}Y_{Index} = \frac{\text{Min}(\{y_i\}_{Index\ Markers}) + \text{Max}(\{y_i\}_{Index\ Markers})}{2}.$$

The same process is then applied to any of the other UCF Index bins containing more than one marker. Consequently, the sample or sitelist is truly spatially distributed unlike with the original coordinate system where the sample is biased to the original coordinate origin near the lower left corner or with a distribution center origin system where the sample is biased to the center of all of the markers; both systems having a potential biased effect on a bin that has markers clustered far from the origin of the whole set.

Once each location or Index center is determined for each marker or a group of markers, respectively, the locations or Index centers are added to the sitelist in step 113, included in the design analysis database in step 115, and a foundry or Fab performs a metrology analysis on the sitelist with coordinate transformation to design coordinates in step 119. At the same time, the UCF Index is added to the database in step 115 with the tag "WP candidate" such that future appearances of the UCF Index (unique-property-set) on a design will automatically be flagged as a WP candidate, and the UCF Index is also tagged with Fab metrology parameters in step 117 and included in the design analysis database of step 115 for analyzing future wafers and/or UCF Indexes in step 105.

Figure 2:
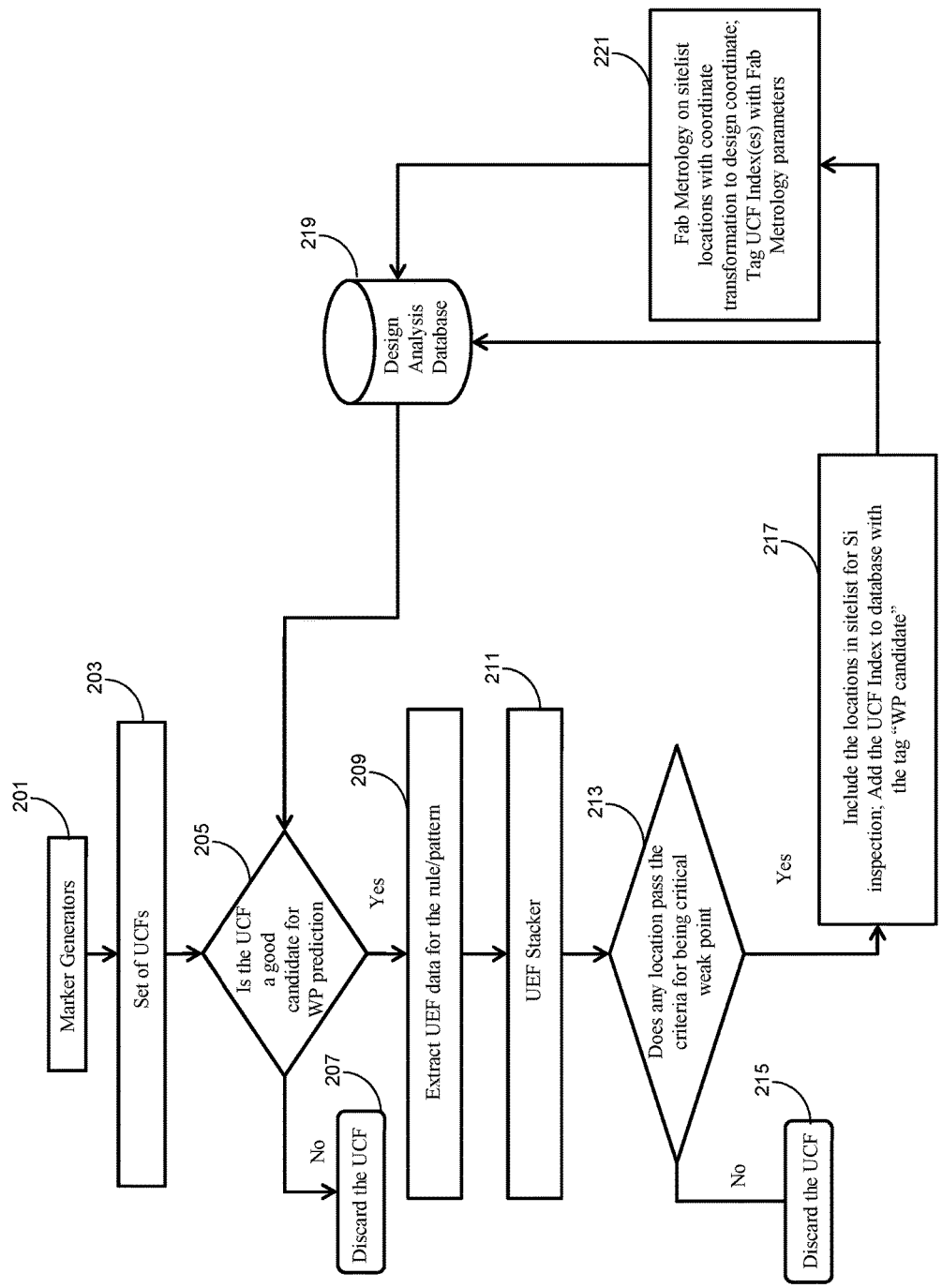
FIG. 2 illustrates a Si wafer WP selection flow based on multiple combined sources (DFM decks), in accordance with another exemplary embodiment.

FIG. 2 illustrates a Si wafer WP selection flow based on multiple combined sources (DFM decks), in accordance with another exemplary embodiment. Steps 201 through 209 of FIG. 2 are identical to steps 101 through 109 of FIG. 1. In step 211, UEF data sets are stacked based on the marker properties from different sources of markers or from different layers of the wafer (vertical stacking) being anchored at the same location on a design. The UEF stacker enables a higher dimensional analysis of the various markers particularly since different rules/patterns run on different layers of the wafer at one time. The different DFM decks or marker sources could be rule-based sources, e.g., MAS, targetMAS, RSA, Device Profiling, yield enhancement suite (YES), etc.; pattern-based sources, e.g., DF-POP, DRC+, etc.; model-based sources, e.g., CMP, Density, etc.; Disposition, e.g., ORC dispositions with the disposition type as equivalent marker properties; or lithography (litho)/etch simulations or Fab metrology, e.g., metrology parameters as corresponding marker properties after coordinate transformation from the Si to design.

In step 213, the location where the various stacked markers are anchored is examined to determine whether that location passes a criteria for being a critical WP. Whether the location passes the criteria is determined by weighting the exact values of UCF Index(es) flagged at the same location of the wafer with different weights for different sources, e.g., some decks have more critical rules/patterns than others, the number of different marker sources that overlap, etc. The correlation across different sources/layers is indicative of the location being a critical WP. However, if the location does not pass the criteria for being a critical WP, then the UCF is discarded in step 215 for the same reasons that a UCF would be discarded in step 107 of FIG. 1 and step 207 of FIG. 2.

In step 217, if the location passes the criteria, then the location may be added to a sitelist for Si inspection. In some instances, the number of UEF data sets within the stacked data set may also be examined (not shown for illustrative convenience) to determine whether the number is larger than an inspection requirement similar to step 111 of FIG. 1. If the number is smaller than the inspection requirement, then the location is added directly to a sitelist for Si inspection in step 217, the sitelist is added to the design analysis database in step 219, and a foundry or Fab performs a metrology analysis on the sitelist with coordinate transformation to design coordinates in step 221. The corresponding UCF Index(es) are also tagged with Fab metrology parameters in step 217 and included in the design analysis database of step 219 for analyzing future wafers and/or UCF Indexes in step 205. However, if the number of markers is greater than an inspection requirement, a UCF-Index-based sampling is performed on the stacked UEF data set (not shown for illustrative convenience) following the process described above in step 119 of FIG. 1. Once each location or Index center is determined for each marker or group of markers, respectively, the locations are added to the sitelist in step 217 and the steps 219 and 221 are repeated. At the same time, the UCF Index is added to the database in step 219 with the tag "WP candidate" such that future appearances of the UCF Index (unique-property-set) on a design will automatically be flagged as a WP candidate and the UCF Index is also tagged with Fab metrology parameters in step 221 and included in the design analysis database of step 219 for analyzing future wafers and/or UCF Indexes in step 205.

The embodiments of the present disclosure can achieve several technical effects including high precision and sensitivity to various sources of markers: the locations on the design sent for feed-forward Si inspection have 100% correlation with the DFM collaterals or models (litho/etch simulations) they are generated from; reduction of licensing costs: the classification of markers using unique set of properties allows binning of the markers without using any EDA vendor tools or incurring high license costs associated with pattern classification; coverage of geometric variability: the UCF-Index-based sampling ensures full coverage of variability along with spatial variation across the design; and the ability to combine different collaterals: data standardization with UEF allows stacking of various marker sources and wafer layers allowing the predictive capability of different DFM collaterals to be combined. Embodiments of the present disclosure enjoy utility in various industrial applications as, for example, microprocessors, smart phones, mobile phones, cellular handsets, set-top boxes, DVD recorders and players, gaming systems, and digital cameras. The present disclosure therefore enjoys industrial applicability in any of various types of Si wafer devices.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A method comprising:
   forming layers in a silicon (Si) wafer;
   generating markers for the Si wafer from an individual design for manufacturing (DFM) deck, the DFM deck based on rules and patterns;
   generating universal compact format (UCF) Indexes based on representative markers, a unique set of values of properties of each generated marker, and an occurrence count of the unique set of values of properties;
   determining whether a representative marker corresponding to a UCF Index is a candidate for weak point (WP) prediction on the wafer;
   extracting all of the markers corresponding to that UCF-Index (universal extended format (UEF) data set) from a WP prediction candidate, the UEF data set based on the values of the properties at each marker location on the wafer;
   performing a UCF-Index-based sampling on the extracted UEF data set if a number of markers in the extracted UEF data set is larger than an inspection requirement;
   adding a location of each marker or group of markers in the extracted UEF data set to a sitelist after the UCF-Index-based sampling;
   sending the sitelist to a foundry to perform metrology analysis using metrology equipment on sitelist locations; and
   adding the sitelist locations and corresponding UCF Index and metrology parameters to a design analysis database for analyzing other Si wafers and/or other UCF Indexes.

2. The method according to claim 1, comprising generating the plurality of markers by:
   comparing the rules and patterns of the DFM deck against design configurations on different layers of the wafer.

3. The method according to claim 1, comprising generating a UCF Index by:
   binning the UEF data associated with each generated marker based on the unique set of values of the properties of each generated marker; and
   assigning an occurrence count for each UCF bin to the UCF Index.

4. The method according to claim 1, comprising determining whether a UCF is a candidate for WP prediction by:
   comparing the UCF against a criticality metric; and
   discarding the UCF if the UCF does not pass the criticality metric.

5. The method according to claim 1, comprising adding the marker location of each marker in the extracted UEF data set to the sitelist without performing the UCF-Index-based sampling if the number of markers in the extracted UEF data set is smaller than an inspection requirement.

6. The method according to claim 1, comprising performing the UCF-Index-based sampling by:
   selecting a number of markers from each UCF Index bin based on a weighting function;
   performing a spatial distribution on markers from each UCF Index bin to determine which of the markers are the selected markers; and
   adding a location of an Index center for each UCF Index bin to the sitelist based on the spatial distribution.

7. A method comprising:
   forming layers in a silicon (Si) wafer;
   generating markers for the wafer from a plurality of design for manufacturing (DFM) decks, each DFM deck based on rules and patterns;
   generating universal compact format (UCF) Indexes based on representative markers, unique set of values of properties of each generated marker, and an occurrence count of the unique set of values of properties;
   determining whether a representative marker corresponding to a UCF Index is a candidate for weak point (WP) prediction on the wafer;
   extracting all of the markers corresponding to that UCF-Index (universal extended format (UEF) data set) from a WP prediction candidate, the UEF data set based on the values of the properties at each marker location on the wafer;
   stacking UEF data sets based on a same location identified on different layers of the wafer and/or by different DFM decks;
   determining whether the same location passes a criteria for being a critical WP;
   adding the same location to a sitelist if the same location passes the criteria;
   sending the sitelist to a foundry to perform metrology analysis using metrology equipment on sitelist locations; and
   adding the sitelist locations and corresponding UCF Index and metrology parameters to a design analysis database for analyzing other Si wafers and/or other UCF Indexes.

8. The method according to claim 7, comprising generating the plurality of markers by:
   comparing the rules and patterns of each DFM deck against design configurations on different layers of the wafer.

9. The method according to claim 7, comprising generating a UCF Index by:
   binning the UEF data associated with each generated marker based on the unique set of values of the properties of each generated marker; and
   assigning an occurrence count for each UCF bin to the UCF Index.

10. The method according to claim 7, comprising determining whether a UCF is a candidate for WP prediction by:
    comparing the UCF against a criticality metric; and
    discarding the UCF if the UCF does not pass the criticality metric.

11. The method according to claim 7, comprising determining whether a same location passes the criteria for being a critical WP by:
    weighting each UCF Index corresponding to the same location based on a corresponding DFM deck; and
    discarding each UCF Index that does not pass the criteria.

12. The method according to claim 7, comprising:
performing a UCF-Index-based sampling on a stacked UEF data set if a number of UEF data sets within the stacked data set is larger than an inspection requirement; and
adding the same location of the stacked UEF data set to the sitelist after the UCF-Index-based sampling or without performing the UCF-Index-based sampling if the number is smaller than the inspection requirement.

13. The method according to claim 12, comprising performing the UCF-Index-based sampling by:
selecting a number of markers from each UCF Index bin based on a weighting function;
performing a spatial distribution on markers from each UCF Index bin to determine which of the marks are the selected markers; and
adding a location of an Index center for each UCF Index bin to the sitelist based on the spatial distribution.

14. An apparatus comprising:
a processor; and
a memory including computer program code for one or more programs, the memory and the computer program code configured to, with the processor, cause the apparatus to:
form layers in a silicon (Si) wafer;
generate markers for the Si wafer from a design for manufacturing (DFM) deck or from a plurality of DFM decks, each DFM deck based on rules and patterns;
generate universal compact format (UCF) Indexes based on representative markers, unique set of values of properties of each generated marker, and an occurrence count of the unique set of values of properties;
determine whether a representative marker corresponding to a UCF Index is a candidate for weak point (WP) prediction on the wafer;
extract all of the markers corresponding to that UCF-Index (universal extended format (UEF) data set) from a WP prediction candidate, the UEF data set based on the values of the properties at each marker location on the wafer;
performing a UCF-Index-based sampling on the extracted UEF data set if a number of markers in the extracted UEF data set is larger than an inspection requirement and the markers are generated by the DFM deck or stack UEF data sets based on a same location identified on different layers of the wafer and/or by different DFM decks if the markers are generated by the plurality of DFM decks;
determine whether the same location passes a criteria for being a critical WP if the plurality of markers are generated by the plurality of DFM decks;
add a location of each marker or group of markers in the extracted UEF data set to a sitelist after the UCF-Index-based sampling the markers are generated by the DFM deck or the same location to the sitelist if the same location passes the criteria and the markers are generated by the plurality of DFM decks;
send the sitelist a foundry for metrology analysis using metrology equipment on the sitelist locations; and
add the sitelist locations and corresponding UCF Index and metrology parameters to a design analysis database for analyzing other Si wafers and/or other UCF Indexes.

15. The apparatus according to claim 14, wherein the apparatus is further caused to:
compare the rules and patterns of the DFM deck or each DFM of the plurality of DFM decks against design configurations on different layers of the wafer to generate the plurality of markers depending on whether the markers are generated by the DFM deck or the plurality of DFM decks, respectively.

16. The apparatus according to claim 14, wherein the apparatus is further caused to:
bin UEF data associated with the markers based on the unique set of values of the properties of each marker; and
assign an occurrence count for each UCF bin to the UCF Index to generate a UCF Index.

17. The apparatus according to claim 14, wherein the apparatus is further caused to:
compare the UCF against a criticality metric to determine whether a UCF is a candidate for WP prediction; and
discard the UCF if the UCF does not pass the criticality metric.

18. The apparatus according to claim 14, wherein the apparatus is further caused to:
weight each UCF Index corresponding to the same location based on a corresponding DFM deck to determine whether the same location passes the criteria for being a critical WP; and
discard each UCF Index that does not pass the criteria.

19. The apparatus according to claim 14, wherein the apparatus is further caused to:
perform a UCF-Index-based sampling on a stacked UEF data set if a number of UEF datasets within the stacked data set is larger than an inspection requirement; and
add the same location of the stacked UEF data set to the sitelist after the UCF-Index-based sampling or without performing the UCF-Index-based sampling if the number is smaller than the inspection requirement.

20. The apparatus according to claim 19, wherein the apparatus is further caused to:
select a number of markers from each UCF Index bin based on a weighting function;
perform a spatial distribution on markers from each UCF Index bin to determine which of the markers are the selected markers; and
add a location of an Index center for each UCF Index bin to the sitelist based on the spatial distribution to perform the UCF-Index-based sampling.

* * * * *